(12) United States Patent
Yamada et al.

(10) Patent No.: US 8,640,670 B2
(45) Date of Patent: Feb. 4, 2014

(54) FUEL-PRESSURE WAVEFORM DETECTOR

(75) Inventors: Naoyuki Yamada, Kariya (JP); Yoshiharu Nonoyama, Nagoya (JP)

(73) Assignee: Denso Corporation, Kariya (JP)

( * ) Notice: Subject to any disclaimer, the term of this patent is extended or adjusted under 35 U.S.C. 154(b) by 419 days.

(21) Appl. No.: 13/161,777

(22) Filed: Jun. 16, 2011

(65) Prior Publication Data
US 2011/0308497 A1      Dec. 22, 2011

(30) Foreign Application Priority Data
Jun. 18, 2010   (JP) ................................ 2010-139474

(51) Int. Cl.
*F02B 3/00*      (2006.01)

(52) U.S. Cl.
USPC ......... 123/299; 73/114.43; 701/103; 123/458

(58) Field of Classification Search
USPC ........ 123/458, 299, 300; 73/114.43; 701/102, 701/103, 115
See application file for complete search history.

(56) References Cited

U.S. PATENT DOCUMENTS

| | | | |
|---|---|---|---|
| 6,722,345 B2* | 4/2004 | Saeki et al. .................. | 123/435 |
| 6,752,126 B2* | 6/2004 | Pfaeffle et al. ............... | 123/436 |
| 7,152,575 B2 | 12/2006 | Fritsch et al. | |
| 7,255,087 B2* | 8/2007 | Kanne et al. ................. | 123/299 |
| 7,900,605 B2* | 3/2011 | Dingle .......................... | 123/480 |
| 7,920,957 B2* | 4/2011 | Mattes et al. ................. | 701/104 |
| 8,113,178 B2* | 2/2012 | Park .............................. | 123/478 |
| 8,306,719 B2* | 11/2012 | Ishizuka ....................... | 701/102 |
| 8,543,313 B2* | 9/2013 | Borchsenius et al. ........ | 701/103 |
| 8,543,314 B2* | 9/2013 | Nakata et al. ................. | 701/103 |
| 2002/0096140 A1* | 7/2002 | Heinzelmann ................ | 123/299 |
| 2006/0259227 A1 | 11/2006 | Fritsch et al. | |
| 2008/0228374 A1* | 9/2008 | Ishizuka et al. .............. | 701/103 |
| 2009/0063013 A1 | 3/2009 | Nakata et al. | |
| 2009/0319157 A1 | 12/2009 | Ishizuka et al. | |

OTHER PUBLICATIONS

Office Action (7 pages) dated Sep. 10, 2013, issued in corresponding German Application No. 10 2011 051 048.6 and English translation (7 pages).

* cited by examiner

*Primary Examiner* — Thomas Moulis
(74) *Attorney, Agent, or Firm* — Nixon & Vanderhye PC

(57) ABSTRACT

A fuel-pressure waveform detector has a detect-waveform obtaining unit for obtaining a multi-stage injection pressure waveform by means of a fuel-pressure sensor while performing a multi-stage fuel injection during one combustion cycle. A model waveform memory stores a reference model pressure waveform of when a single fuel injection is performed. A waveform extracting unit extracts a pressure waveform due to the subject fuel injection by subtracting the reference model pressure waveform from the multi-stage injection pressure waveform. A correction unit corrects the reference model pressure waveform in such a manner that its attenuation degree becomes larger as a fuel injection period of the subject fuel injection is longer.

5 Claims, 8 Drawing Sheets

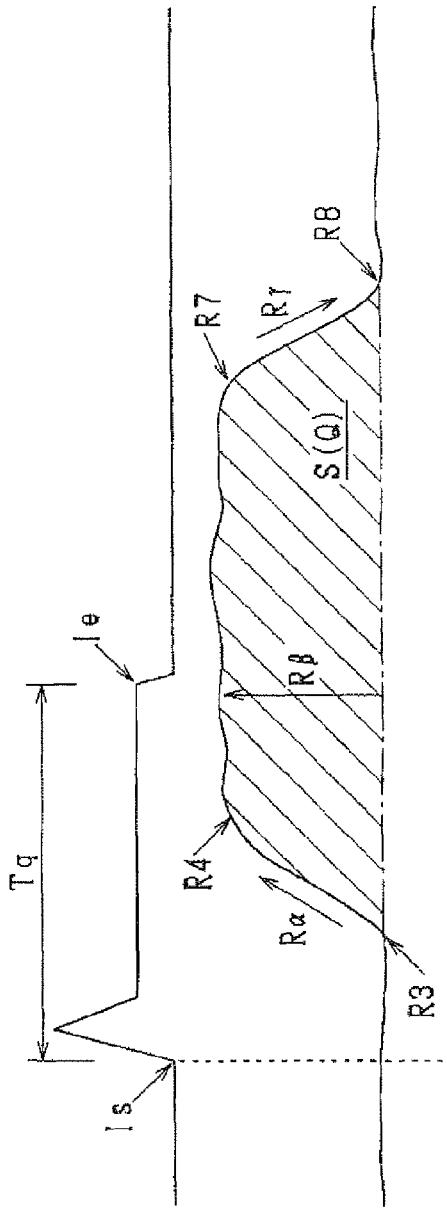
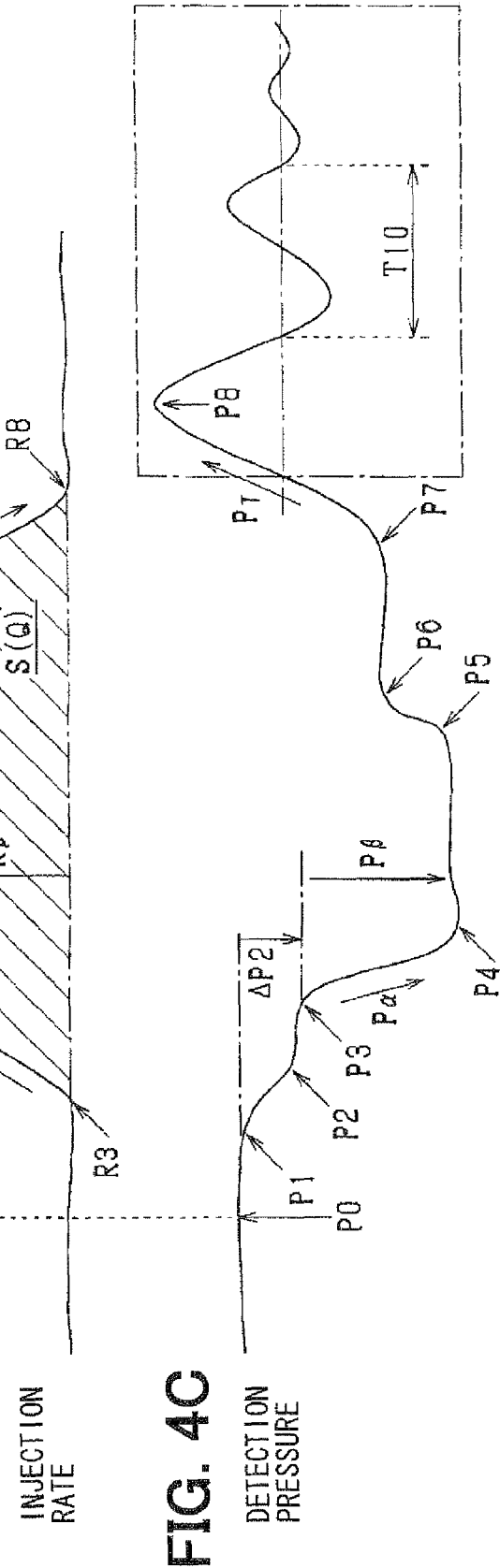
FIG. 4A INJECTION COMMAND SIGNAL
FIG. 4B INJECTION RATE
FIG. 4C DETECTION PRESSURE

DRIVING-CURRENT

FUEL PRESSURE

DRIVING-CURRENT

FUEL PRESSURE

FUEL PRESSURE

FUEL PRESSURE

FUEL-PRESSURE WAVEFORM DETECTOR

CROSS-REFERENCE TO RELATED APPLICATION

This application is based on Japanese Patent Application No. 2010-139474 filed on Jun. 18, 2010, the disclosure of which is incorporated herein by reference.

FIELD OF THE INVENTION

The present invention relates to a fuel-pressure waveform detector which detects a fuel-pressure waveform indicative of a variation in fuel pressure, which is caused due to a fuel injection through a fuel injector of an internal combustion engine.

BACKGROUND OF THE INVENTION

It is important to detect a fuel injection condition, such as a fuel-injection-start timing, a fuel injection quantity and the like in order to accurately control an output torque and emission of an internal combustion engine. JP-2010-3004A (US-2009/0319157A1) and JP-2009-57924A (US-2009/0063013A1) describe that a fuel pressure sensor detects a variation in fuel pressure, which is caused in a fuel supply passage due to a fuel injection, whereby an actual fuel injection condition is detected.

For example, an actual fuel-injection-start timing is detected by detecting a timing at which the fuel pressure in the fuel injection system starts to be decreased due to the fuel injection. An actual fuel-injection-quantity is detected by detecting a decrease in fuel pressure due to the fuel injection. As above, if the actual fuel injection condition is detected, the fuel injection condition can be accurately controlled based on the detected fuel injection condition.

In a case that a multi-stage injection is performed during one combustion cycle, following matters should be noted. FIG. 5B shows a waveform (multi-stage injection waveform) "W" detected by a fuel pressure sensor while the multi-stage injection is performed. In this waveform "W", a part of the waveform corresponding to the n-th fuel injection (refer to a portion enclosed by a dashed line in FIG. 5B) is overlapped with an aftereffect of the waveform corresponding to the m-th (m=n-1) fuel injection (refer to a portion enclosed by a dashed line in FIG. 5D).

In JP-2010-3004A, a model waveform "CALn−1" corresponding to only the m-th fuel injection is previously computed and stored as shown in FIG. 5D. Then, as shown in FIG. 5E, the model waveform "CALn−1" is subtracted from the detected waveform "W" to obtain a waveform "Wn" corresponding to only the n-th fuel injection. FIG. 5F shows this waveform "Wn".

However, according to the present inventors' experiments, even if the model waveform "CALn−1" is simply subtracted from the detected waveform "W", the waveform "Wn" is not obtained with high accuracy.

SUMMARY OF THE INVENTION

The present invention is made in view of the above matters, and it is an object of the present invention to provide a fuel-pressure waveform detector which is able to extract a waveform due to a second or succeeding fuel injection from a fuel-pressure waveform due to a multi-stage injection with high accuracy.

The fuel-pressure waveform detector is applied to a fuel injection system which includes a fuel injector injecting a fuel into an internal combustion engine through a fuel injection hole, and a fuel-pressure sensor detecting a variation in the fuel pressure in a fuel-supply passage due to a fuel injection by the fuel injector.

The detector has a detect-waveform obtaining means for obtaining a multi-stage injection pressure waveform by means of the fuel-pressure sensor while performing a multi-stage fuel injection during one combustion cycle of the internal combustion engine. The detector further includes a model waveform store means for storing a reference model pressure waveform of when a previous fuel injection is performed before a subject fuel injection is performed. The detector still further includes a waveform extracting means for extracting a pressure waveform due to the subject fuel injection by subtracting the reference model pressure waveform from the multi-stage injection pressure waveform; and a correction means for correcting the reference model pressure waveform in such a manner that its attenuation degree becomes larger as a fuel injection period of the subject fuel injection is longer.

The present inventors has performed following experiments No. 1 and No. 2 to confirm an accuracy of an extracted waveform "Wn" which is obtained by subtracting a model pressure waveform "CALn−1" from the detected pressure waveform "W" shown in FIGS. 5A to 5F.

In the experiment No. 1, the detected pressure waveform "W" in a case of multi-stage fuel injection is obtained (refer to FIG. 9B). Then, only the n-th fuel injection is performed to obtain the detected waveform "W0n" (refer to FIG. 9C). The detected pressure waveform "W0n" is subtracted from the detected waveform "W" to extract the waveform "W0n−1" shown in FIG. 9D.

However, according to the inventors' study, as shown in FIG. 9E, it has become apparent that the pressure waveform "W0n−1" is different from the model pressure waveform "CALn−1" representing the (n−1)-th fuel injection in the following point. That is, an amplitude "A1" of the pressure waveform "W0n−1" corresponding to the n-th and successive fuel injection is smaller than the amplitude "A2" of the model pressure waveform "CALn−1".

Furthermore, according to the experiment No. 2, it has become apparent that the amplitude "A1" of the detected waveform "W0n−1" becomes smaller as the fuel injection period "Tqn" of the n-th fuel injection is longer, FIG. 10 is a graph showing an experiment result of the experiment No. 2. In this graph, solid lines respectively represent fuel pressure 200 MPa, 140 MPa, 80 MPa, 40 MPa.

As shown in FIG. 10, without respect to the supply fuel pressure, the amplitude "A1" of the detected waveform "W0n−1" becomes smaller as the fuel injection period "Tqn" of the n-th fuel injection is longer. If the fuel injection period of the n-th fuel injection is zero, the amplitude ratio A1/A2 is 1.0. In other word, due to the n-th fuel injection, the amplitude "A1" of the detected waveform "W0n−1" becomes smaller.

According to the present inventors' study, the above phenomenon occurs as follows. The fuel pressure wave transmits in the fuel supply passage toward the fuel injection hole of the fuel injector. A part of the transmitting fuel pressure wave is reflected at a place around the fuel injection hole and is transmitted toward the fuel pressure sensor. Due to the reflected fuel pressure wave, an aftereffect is generated in the fuel pressure waveform detected by the fuel pressure sensor. This aftereffect of the fuel pressure waveform is represented by asymptotic lines "k1" and "k2" in FIGS. 6C and 6D. When the fuel injection hole is closed by a valve body to stop the fuel injection, a reflection degree of the fuel around the injection hole is increased and the amplitude of the fuel pressure wave is increased.

Meanwhile, when the fuel injection hole is opened by the valve body to inject the fuel, the reflection degree of the fuel is decreased. Thus, the amplitude of the fuel pressure wave is decreased. As the valve opening period is longer, the reflection quantity of the fuel is more decreased and the amplitude of the pressure wave is more decreased.

The present invention is made based on the above experiments No. 1 and No. 2 and the inventors' study. That is, as shown in FIGS. 5A to 5F, the waveform extracting means extracts a pressure waveform "Wn" due to the subject fuel injection (n-th fuel injection) by subtracting the reference model pressure waveform "CALn−1" corresponding to the (n−1)-th fuel injection from the multi-stage injection pressure waveform "W". An attenuation coefficient "k" of the model waveform "CALn−1" is corrected according to the fuel-injection period "Tqn" of the n-th fuel injection. As the fuel-injection period "Tqn" of the n-th fuel injection is longer, the attenuation coefficient "k" is made larger.

Therefore, since the model waveform "CALn−1" can be brought close to the actually detected waveform "W0n−1" which is obtained by subtracting the waveform "W0n" from the multi-stage injection pressure waveform "W", the pressure waveform "Wn" due to the n-th fuel injection can be extracted from the detected multi-stage injection pressure waveform "W" with high accuracy.

BRIEF DESCRIPTION OF THE DRAWINGS

Other objects, features and advantages of the present invention will become more apparent from the following description made with reference to the accompanying drawings, in which like parts are designated by like reference numbers and in which:

FIGS. 4A to 4C are time charts showing a relationship between a pressure waveform detected by the fuel pressure senor and a waveform of injection rate in a case of a single-stage injection;

DETAILED DESCRIPTION OF EMBODIMENTS

Hereafter, an embodiment of a fuel-pressure waveform detector according to the present invention will be described, hereinafter. A fuel-pressure waveform detector is applied to an internal combustion engine (diesel engine) having four cylinders #1-#4.

Figure 1:
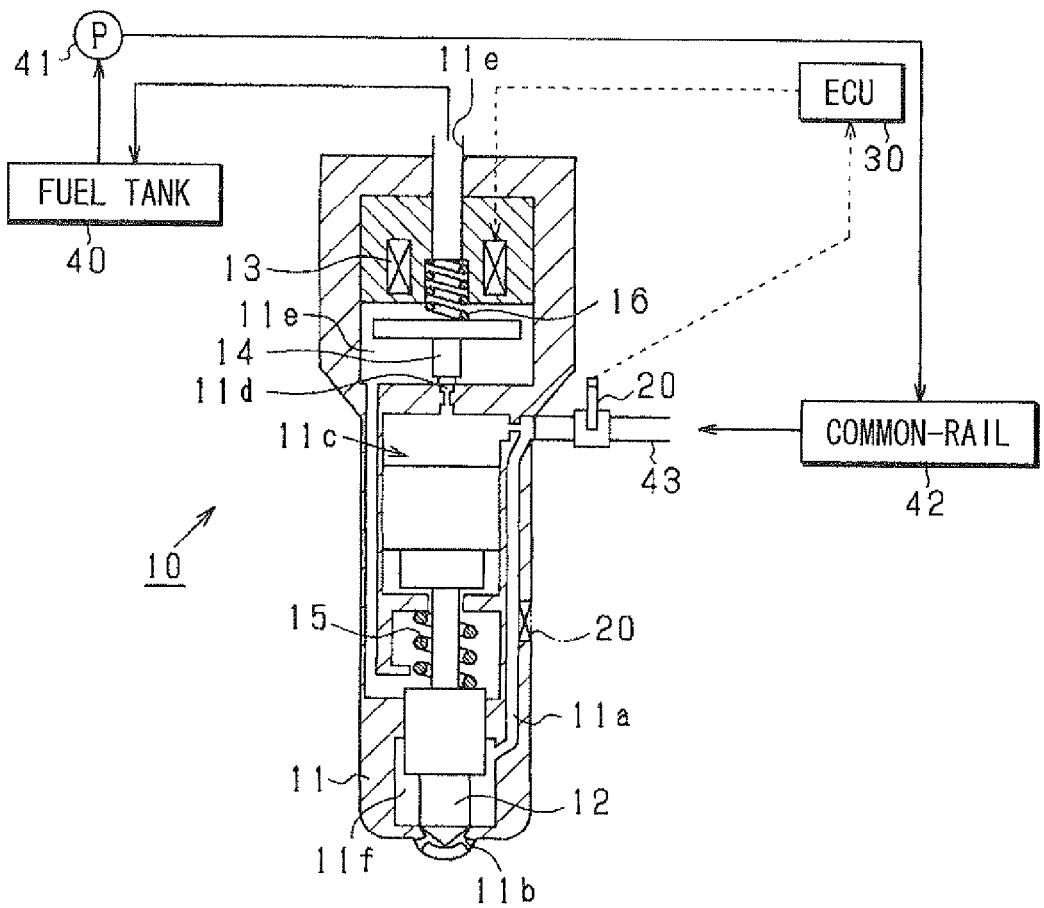
FIG. 1 is a construction diagram showing a fuel injection system to which a fuel pressure detector is applied according to a first embodiment of the present invention.

FIG. 1 is a schematic view showing a fuel injector 10, a fuel-pressure sensor 20, an electronic control unit (ECU) 30 and the like. In a fuel injection system including the fuel injector 10, a fuel contained in a fuel tank 40 is pumped up by a high-pressure pump 41 and is accumulated in a common-rail 42 to be supplied to the fuel injector 10 through a high-pressure pipe 43.

The fuel injector 10 is comprised of a body 11, a needle (valve body) 12, an electromagnetic solenoid (actuator) 13 and the like. The body 11 has a high-pressure passage 11$a$ therein. The fuel supplied from the common-rail 42 flows through the high-pressure passage 11$a$ and is injected into a combustion chamber (not shown) through an injection hole 11$b$. A part of the fuel flowing through the high-pressure passage 11$a$ is introduced into a back-pressure chamber 11$c$ formed in the body 11. A leak port lid of the back-pressure chamber 11$c$ is opened/closed by a control valve 14 which is driven by the electromagnetic solenoid 13. The needle 12 receives biasing force from a spring 15 and a fuel pressure in the back-pressure chamber 11$c$ in a direction of closing the injection hole 11$b$. Also, the needle 12 receives biasing force from the fuel accumulated in a sac portion 11$f$ in a direction of opening the injection hole 11$b$.

A fuel-pressure sensor 20 detecting fuel pressure is provided in a fuel supply passage between the common-rail 42 and the injection hole 11$b$, for example, in the high-pressure pipe 43 or the high-pressure passage 11$a$. In the present embodiment shown in FIG. 1, the fuel-pressure sensor 20 is provided to a connecting portion between the high-pressure pipe 43 and the body 11. Alternatively, as shown by a dashed line in FIG. 1, the fuel-pressure sensor 20 can be provided to the body 11. The fuel pressure sensor 20 is provided to each of the #1-#4 fuel injectors 10.

An operation of the fuel injector 10 will be described hereinafter. While the electromagnetic solenoid 13 is not energized, the control valve 14 is biased by the spring 16 to close the leak port 11$d$. Thereby, the fuel pressure in the back-pressure chamber 11$c$ is increased, so that the needle 12 closes the injection hole 11$b$. Meanwhile, when the electromagnetic solenoid 13 is energized, the control valve 14 opens the leak port 11$d$ against the spring 16. Then, the fuel pressure in the back-pressure chamber 11$c$ is decreased to open the injection hole 11$b$, so that the fuel is injected into the combustion chamber from the injection hole 11$b$.

It should be noted that while the electromagnetic solenoid 13 is energized and fuel injection is performed, the fuel introduced into the back-pressure chamber 11$c$ from the high-pressure passage 11$a$ is discharged into a low-pressure passage 11$e$ through the leak port 11$d$. That is, during the fuel injection, the fuel in the high-pressure passage 11$a$ is always discharged into the low-pressure passage 11$e$ through the back-pressure chamber 11$c$.

The ECU 30 controls the electromagnetic solenoid 13 to drive the needle 12. For example, the ECU 30 computes a target fuel injection condition including a fuel-injection-start timing, a fuel-injection-end timing and a fuel-injection quantity, and the like. Then, the ECU 30 drives the electromagnetic solenoid 13 to obtain the target fuel injection condition.

Figure 2:
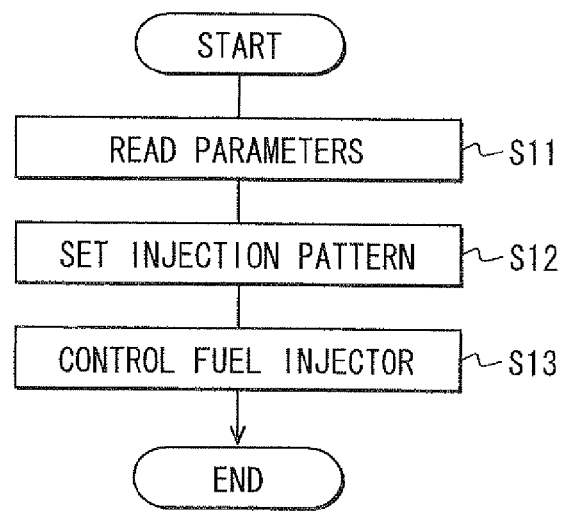
FIG. 2 is a flowchart showing a fuel injection control according to the first embodiment.

Referring to a flowchart shown in FIG. 2, a control processing for driving the electromagnetic solenoid 13 will be described hereinafter.

In step S11, the ECU 30 reads specified parameters indicative of the engine driving condition, such as engine speed, engine load, fuel pressure supplied to the fuel injector 10 and the like.

In step S12, the ECU 30 sets the injection pattern based on the parameters which are read in step S11. For example, optimum fuel-injection patterns are previously stored as an injection control map with respect to the parameters. Based on the parameters read in step S11, the optimum target fuel-injection pattern is established. It should be noted that the target fuel-injection pattern is determined based on the parameters such as a number of fuel injection per one combustion cycle, a fuel-injection-start timing and fuel-injection period (fuel-injection quantity) of each fuel injection. The injection control map indicates a relationship between the parameters and the optimum injection pattern.

In step S13, the ECU 30 outputs a fuel-injection command signal to the electromagnetic solenoid 13 based on the target fuel-injection pattern determined in step S12. Thereby, the fuel-injection is performed in the optimum pattern according to the parameters obtained in step S11.

However, it is likely that the actual fuel-injection pattern may deviate from the target fuel-injection pattern due to a deterioration with age of the fuel injector 10 or an individual difference of the fuel injector 10. In order to avoid such a deviation, the actual fuel-injection pattern (actual fuel-injection condition) is detected based on the detection value of the fuel-pressure sensor 20. Further, the fuel-injection command signal is corrected in such a manner that the detected actual fuel-injection pattern agrees with the target fuel-injection pattern. This correction is learned to be utilized for computing the successive fuel injection command signal.

Figure 3:
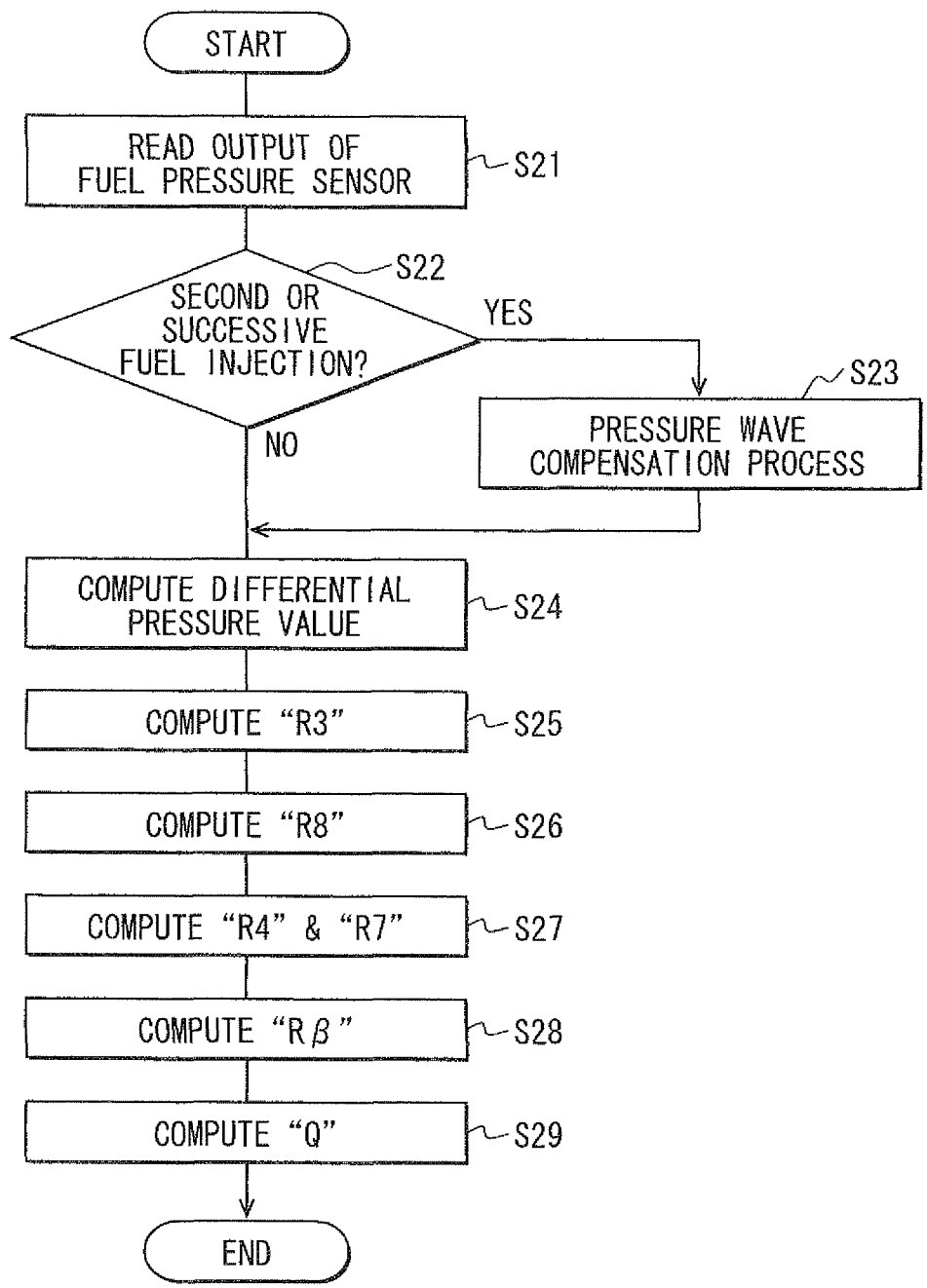
FIG. 3 is a flowchart showing a procedure for detecting a fuel injection condition based on a detection pressure detected by a fuel pressure sensor according to the first embodiment.

Referring to FIG. 3, a processing for detecting (computing) an actual fuel injection condition based on the detection value of the fuel-pressure sensor 20 will be described.

The processing shown in FIG. 3 is performed at a specified cycle (for example, a computation cycle of the CPU) or at every specified crank angle. In step S21 (detected waveform obtaining means), an output value (detection pressure) of the fuel pressure sensor 20 is read. This process is executed with respect to each fuel-pressure sensor 20. It is preferable that the output value is filtered to remove high-frequency noises therefrom.

Figure 5A:
FIGS. 5A to 5F are time charts for explaining a pressure wave compensation process in step S23 of FIG. 3.
Figure 5B:
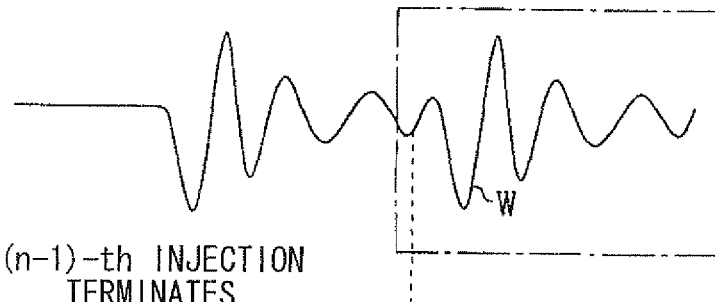
Figure 5C:
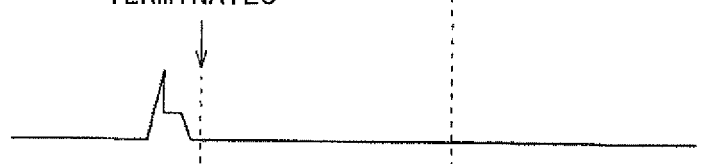

Referring to FIGS. 5A to 5C, the processing in step S21 will be described in detail.

FIG. 4A shows the injection command signal which the fuel injector 10 receives from the ECU 300 in step S13. When the injection command signal is supplied to the injector 10, the electromagnetic solenoid 13 is energized to open the injection hole 11b. That is, the ECU 30 commands the fuel injector 10 to start the fuel injection at a fuel-injection-start command timing "Is", and the ECU 30 commands the fuel injector 10 to stop the fuel injection at a fuel-injection-end command timing "Ie". During a time period "Tq" from the timing "Is" to the timing "Ie", the injection port lib is opened. By controlling the time period "Tq", the fuel injection quantity "Q" is controlled. FIG. 4B shows a variation in fuel injection rate, and FIG. 4C shows a variation in detection pressure detected by the fuel pressure sensor 20. It should be noted that FIGS. 5A to 5C show a case in which the injection hole 11b is opened and close only once.

The ECU 30 detects the output value of the fuel pressure sensor 20 by a sub-routine (not shown). In this sub-routine, the output value of the fuel pressure sensor 20 is detected at a short interval so that a pressure waveform can be drawn as shown in FIG. 4C. Specifically, the sensor output is successively acquired at an interval shorter than 50 microsec (desirably 20 microsec). Such sensor output is read in step S21.

Since the fuel-pressure waveform detected by the fuel pressure sensor 20 and the variation in the injection rate have a relationship described below, a waveform of the injection rate can be estimated based on the detected fuel-pressure waveform.

After the electromagnetic solenoid 13 is energized at the fuel-injection-start command timing "Is" to start the fuel injection from the injection hole 11b, the injection rate starts to increase at a changing point "R3" as shown in FIG. 4B. That is, an actual fuel injection is started. Then, the injection rate reaches the maximum injection rate at a changing point "R4". In other wards, the needle valve 20c starts to be lifted up at the changing point "R3" and the lift-up amount of the needle valve 20c becomes maximum at the changing point "R4".

It should be noted that the "changing point" is defined as follows in the present application. That is, a second order differential of the injection rate (or a second order differential of the detection pressure detected by the fuel pressure sensor 20a) is computed. The changing point corresponds to an extreme value in a waveform representing a variation in the second order differential. That is, the changing point of the injection rate (detection pressure) corresponds to an inflection point in a waveform representing the second order differential of the injection rate (detection pressure).

Then, after the electromagnetic solenoid 13 is deenergized at the fuel-injection-end command timing "Ie", the injection rate starts to decrease at a changing point "R7". Then, the injection rate becomes zero at a changing point "R8" and the actual fuel injection is terminated. In other wards, the needle valve 20c starts to be lifted down at the changing point "R7" and the injection hole 11b is sealed by the needle valve 20c at the changing point "R8".

FIG. 4C shows a variation in fuel-pressure detected by the fuel-pressure sensor 20. Before the fuel-injection-start command timing "Is", the detection pressure is denoted by "P0". After the driving current is applied to the electromagnetic solenoid 13, the detection pressure starts to decrease at a changing point "P1" before the injection rate start to increase at the changing point "R3". This is because the control valve 14 opens the leak port 11d and the pressure in the backpressure chamber 11c is decreased at the changing point "P1". When the pressure in the backpressure chamber 11c is decreased enough, the detection pressure drop is stopped at a changing point "P2". It is due to that the leak port 11d is fully opened and the leak quantity becomes constant, depending on an inner diameter of the leak port 11d.

Then, when the injection rate starts to increase at the changing point "R3", the detection pressure starts to decrease at a changing point "P3". When the injection rate reaches the maximum injection rate at a changing point "R4", the detection pressure drop is stopped at a changing point "P4". It should be noted that the pressure drop amount from the changing point "P3" to the changing point "P4" is greater than that from the changing point "P1" to the changing point "P2".

Then, the detection pressure starts to increase at a changing point "P5". It is due to that the control valve 14 seals the leak port 11d and the pressure in the backpressure chamber 11c is increased at the point "P5". When the pressure in the backpressure chamber 11c is increased enough, an increase in the detection pressure is stopped at a changing point "P6".

When the injection rate starts to decrease at a changing point "R7", the detection pressure starts to increase at a changing point "P7". Then, when the injection rate becomes zero and the actual fuel injection is terminated at a changing point "R8", the increase in the detection pressure is stopped at a changing point "P8". It should be noted that the pressure increase amount from the changing point "P7" to the changing point "P8" is greater than that from the changing point "P5" to the changing point "P6". After the changing point "P8", the detection pressure is attenuated at a specified period T10.

As described above, by detecting the changing points "P3", "P4", "P7" and "P8" in the detection pressure, the starting point "R3" of the injection rate increase (an actual fuel-injection-start timing), the maximum injection rate point "R4", the starting point "R7" of the injection rate decrease, and the ending point "R8" of the injection rate decrease (the actual fuel-injection-end timing) can be estimated. Based on a relationship between the variation in the detection pressure and the variation in the fuel injection rate, which will be described below, the variation in the fuel injection rate can be estimated from the variation in the detection pressure.

That is, a decreasing rate "Pα" of the detection pressure from the changing point "P3" to the changing point "P4" has a correlation with an increasing rate "Rα" of the injection rate from the changing point "R3" to the changing point "R4". An increasing rate "Pγ" of the detection pressure from the changing point "P7" to the changing point "P8" has a correlation with a decreasing rate "Rγ" of the injection rate from the changing point "R7" to the point "R8". A decreasing amount "Pβ" of the detection pressure from the changing point "P3" to the changing point "P4" (maximum pressure drop amount "Pβ") has a correlation with a increasing amount "Rβ" of the injection rate from the changing point "R3" to the changing point "R4" (maximum injection rate "Rβ"). Therefore, the increasing rate "Rα" of the injection rate, the decreasing rate "Rγ" of the injection rate, and the maximum injection rate "Rβ" can be estimated by detecting the decreasing rate "Pα" of the detection pressure, the increasing rate "Pγ" of the detection pressure, and the maximum pressure drop amount "Pβ" of the detection pressure. As above, the variation in the injection rate (variation waveform) shown in FIG. 4B can be estimated by estimating the changing points "R3", "R4", "R7", "R8", the increasing rate "Rα" of the injection rate, the maximum injection rate "Rβ" and the decreasing rate "Rγ" of the injection rate.

Furthermore, a value of integral "S" of the injection rate from the actual fuel-injection start-timing to the actual fuel-injection-end timing (shaded area in FIG. 4B) is equivalent to the injection quantity "Q". A value of integral of the detection pressure from the actual fuel-injection-start timing to the actual fuel-injection-end timing has a correlation with the value of integral "S" of the injection rate. Thus, the value of integral "S" of the injection rate, which corresponds to the injection quantity "Q", can be estimated by computing the value of integral of detection pressure detected by the fuel pressure sensor 20. As described above, the fuel pressure senor 20 can be operated as an injection condition sensor which detects a physical quantity relating to the fuel injection condition of the fuel supplied to the fuel injector 10.

Referring back to FIG. 3, in step S22, the computer determines whether the current fuel injection is the second or the successive fuel injection. When the answer is Yes in step S22, the procedure proceeds to step S23 in which a pressure wave compensation process is performed with respect to the waveform of detection pressure obtained in step S21. The pressure wave compensation process will be described hereinafter.

Figure 5D:
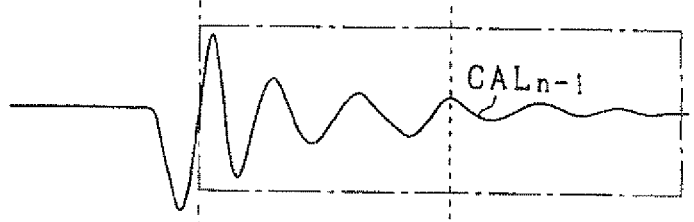

FIG. 5A is a time chart showing a driving-current supplied to the electromagnetic solenoid 13 when the ECU 30 outputs the fuel-injection command signal so as to inject the fuel twice. FIG. 5B is a chart showing a detected fuel-pressure waveform "W" in a case that the driving-current shown in FIG. 5A is supplied. FIG. 5C is a time chart showing a driving-current supplied to the electromagnetic solenoid 13 when the ECU 30 outputs the fuel-injection command signal so as to inject the fuel only once. FIG. 5D is a chart showing a detected fuel-pressure waveform "CALn−1" in a case that the driving-current shown in FIG. 5C is supplied.

In the waveform "W" shown in FIG. 5B, a part of the waveform corresponding to the n-th fuel injection (refer to a portion enclosed by a dashed line in FIG. 5B) is overlapped with an aftereffect of the waveform corresponding to the previous fuel injections ((n−1)-th fuel injection, (n−2)-th fuel injection, (n−3)-th fuel injection, ... ). FIG. 5D shows an aftereffect of the waveform corresponding to (n−1)-th fuel injection. After the (n−1)-th fuel injection is terminated, the fuel-pressure waveform is attenuated at a specified period T10 (refer to a portion enclosed by a dashed line in FIG. 5D). This aftereffect of the waveform overlaps the waveform corresponding to the n-th fuel injection (refer to a portion enclosed by a dashed line in FIG. 5B). Thus, if the variation in fuel injection rate due to the n-th fuel injection is estimated from the waveform "W", it estimation error becomes large.

Figure 5E:
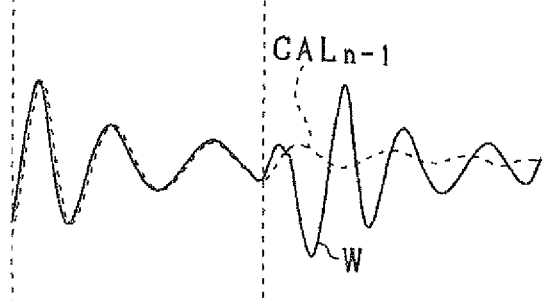
Figure 5F:
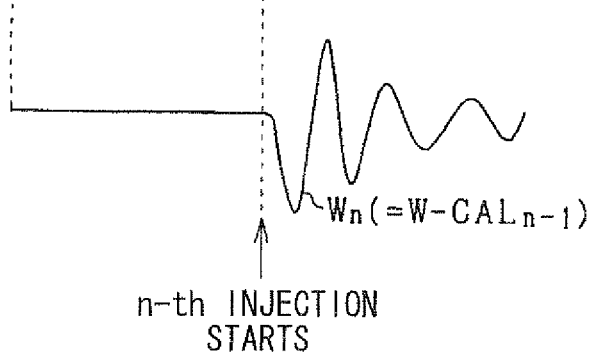

In the pressure wave compensation process of step S23, the aftereffect of the waveform due to the previous fuel injection is subtracted from the fuel-pressure waveform "W" to obtain the fuel-pressure waveform "Wn" due to the n-th fuel injection as shown in FIG. 5F. Specifically, a various types of single fuel injection are previously experimentally performed to obtain its aftereffect of the waveform. In each single fuel injection, the fuel-injection-start fuel-pressure (supply fuel pressure) corresponding to "P0" and the fuel-injection quantity corresponding to the time period "Tq" are varied. The aftereffect of the waveform obtained by experiments or the aftereffect of the waveform expressed by a mathematical formula corresponds to a model waveform. The model waveforms are previously stored in a memory of the ECU 30 (model waveform store means).

In the present embodiment, the aftereffect of the waveform expressed by the following formula (1) is stored as the model waveform. In the formula (1), "p" represents a reference pressure of the model waveform detected by the fuel-pressure sensor 20. "A", "k", "ω" and "θ" are parameters which respectively indicate amplitude of attenuated vibration, attenuation coefficient, frequency and phase. An elapsed time is denoted by "t". These parameters "A", "k", "ω" and "θ" are established according to the fuel injection condition, such as fuel-injection-start pressure, a fuel-injection quantity and the like.

$$p = A\exp(-kt)\sin(\omega t + \theta) \quad (1)$$

In a case that a model waveform of the aftereffect waveform corresponding to (n−1)-th fuel injection will be obtained, an optimum model waveform is selected from the model waveforms stored in the memory according to the injection condition of the (n−1)-th fuel injection. The selected model wave is defined as the reference model waveform "CALn−1" representing an aftereffect of (n−1)-th fuel injection. In FIG. 5E, a dashed line represents the model waveform "CALn−1" and a solid line represents the detected waveform "W". The model waveform "CALn−1" is subtracted from the detected waveform "W" to extract the waveform "Wn" shown in FIG. 5F. The extracted waveform "Wn" has a high correlation with the variation in fuel-injection rate due to the n-th fuel injection.

In FIGS. 5E and 5F, only the model waveform "CALn−1" is subtracted from the detected waveform "W". Alternatively, the aftereffects of the waveform due to the (n−2)-th or proceeding fuel injection may be subtracted from the detected waveform "W". In FIGS. 6A to 6E, the model waveforms "CALn−1" and "CALn−2" are subtracted from the detected waveform "W".

Figure 9:
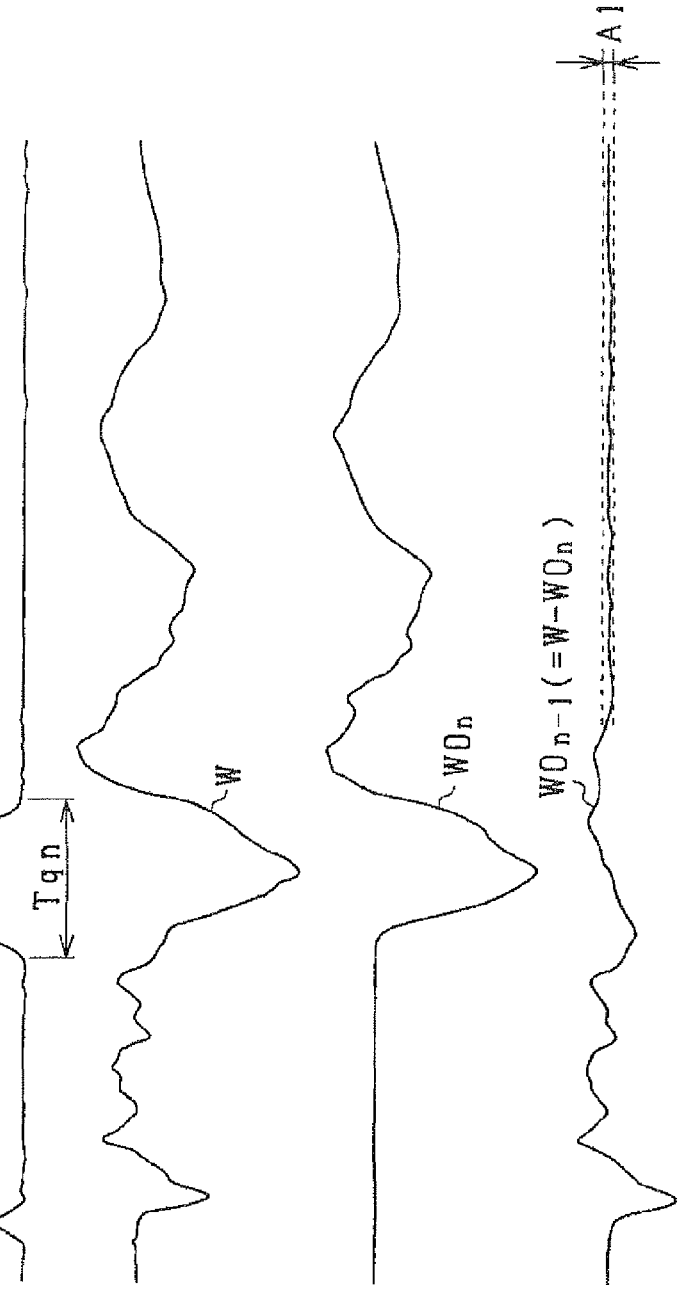
FIGS. 9A to 9E are time charts showing a result of an experiment No. 1 which the present inventors conducted.
Figure 10:
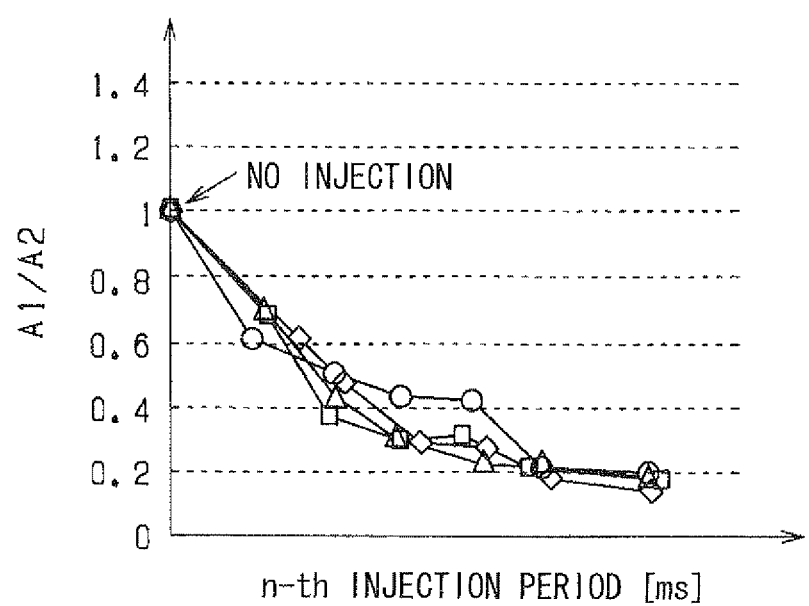
FIG. 10 is a graph showing a result of an experiment No. 2 which the present inventors conducted.

According to the present inventors' study, as shown in FIGS. 9 and 10, an amplitude "A1" of the detected waveform "W0n−1" becomes smaller as the fuel injection period "Tqn" of the n-th fuel injection is longer. Thus, the model waveforms "CALn−1" and "CALn−2" are corrected in such a manner that the degree of attenuation becomes larger as the fuel injection period "Tqn" of the n-th fuel injection. This "degree of attenuation" corresponds to the attenuation coefficient "k" in the formula (1).

Figure 6A:
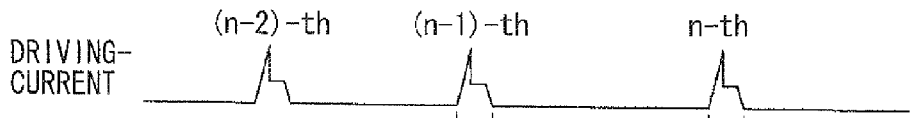
FIGS. 6A to 6E are time charts for explaining a pressure wave compensation process in step S23 of FIG. 3.
Figure 6B:
Figure 6C:
Figure 6D:
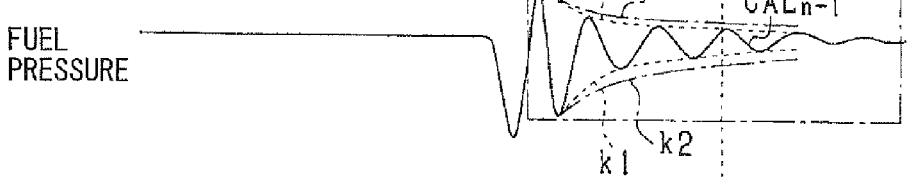

In FIGS. 6C and 6D, the model waveforms "CALn−1" and "CALn−2" indicated by solid lines are corrected waveforms in such a manner that the degree of attenuation becomes greater. Dashed lines "k1" represent asymptotic lines along peak values of the corrected model waveform. Long dashed short dashed lines "k2" represent asymptotic lines along peak values of uncorrected mode waveform. When the attenuation coefficient "k" in the formula (1) is varied, the slopes of the asymptotic lines "k1" and "k2" are also varied. That is, as the attenuation coefficient "k" is set larger to increase the "degree of attenuation", the slope of the asymptotic line "k2" is also made greater.

Referring back to FIG. 3, when the answer is NO in step S22, the procedure proceeds to step S24 in which the detection pressure (pressure waveform) is differentiated to obtain a waveform of differential value of the detection pressure. When the answer is YES in step S22, the compensated detection pressure (pressure waveform) is differentiated in step S24.

In steps S25 to S28, the various injection condition values shown in FIG. 4B are computed based on the differential value of the detection pressure obtained in step S24. That is, a fuel-injection-start timing "R3" is computed in step S25, a fuel-injection-end timing "R8" is computed in step S26, a maximum-injection-rate-reach timing "R4" and an injection-rate-decrease-start timing "R7" are computed in step S27, and the maximum injection rate "Rβ" is computed in step S28. In a case that the fuel injection quantity is small, the maximum-injection-rate-reach timing "R4" may agree with the injection-rate-decrease-start timing "R7".

In step S29, the computer computes the value of integral "S" of the injection rate from the actual fuel-injection-start timing to the actual fuel-injection-end timing based on the above injection condition values "R3", "R8", "Rβ", "R4", "R7". The value of integral "S" is defined as the fuel injection quantity "Q". It should be noted that the value of integral "S" (fuel injection quantity "Q") may be computed based on the increasing rate "Rα" of the injection rate and the decreasing rate "Rγ" of the injection rate in addition to the above injection condition values "R3", "R8", "Rβ", "R4", "R7".

Figure 7:
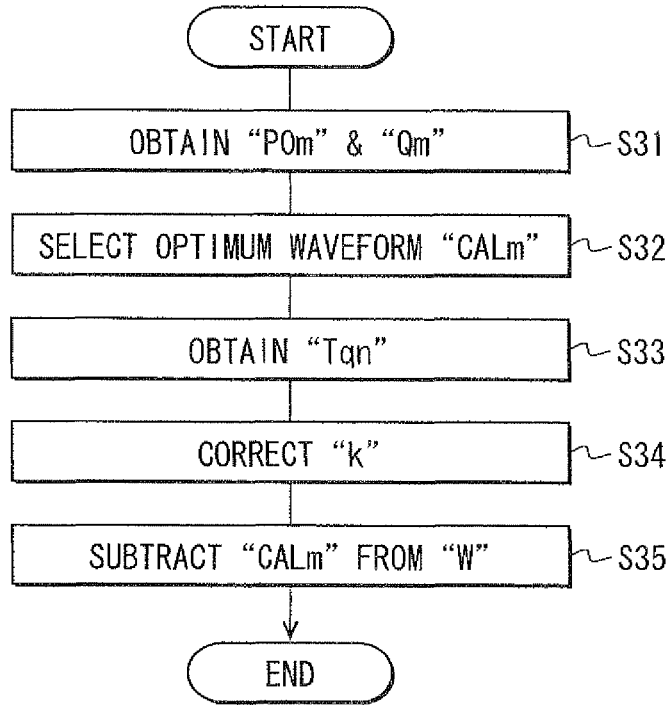
FIG. 7 is a flowchart showing a pressure wave compensation process in step S23 of FIG. 3.

Referring to a flowchart shown in FIG. 7, the pressure wave compensation process in step S23 will be described. This processing is a subroutine of step S23. In step S31, a fuel-injection-start pressure "P0m" and the fuel injection quantity "Qm" of the m-th fuel injection are obtained. The fuel injection quantity computed in step S29 may be used as the fuel injection quantity "Qm". Alternatively, the fuel injection quantity estimated from the time period "Tqm" can be used as the fuel injection quantity "Qm".

In step S32, the optimum model waveform "CALm" is selected from the various model waveforms stored in the memory based on the fuel pressure "P0m" and the fuel injection quantity "Qm" obtained in step S31. In step S33, based on the fuel injection command signal of the n-th injection, the fuel injection period "Tqn" is obtained for the n-th fuel injection. In step S34 (correction means), based on the fuel injection period "Tqn", the attenuation coefficient "k" of the model waveform "CALm" is corrected.

Figure 8:
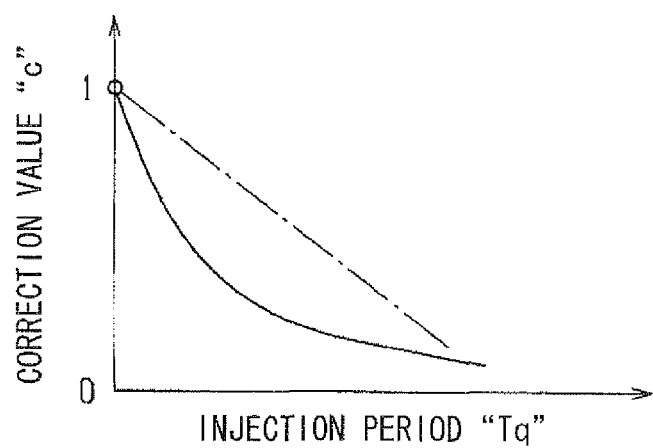
FIG. 8 is a graph showing a relationship between a correction value "c" of an attenuation coefficient "k" and a fuel injection period "Tq"

FIG. 8 is a map showing a relationship between a correction value "c" of the attenuation coefficient "k" and the fuel injection period "Tq". This map is previously obtained based on the experiment and is stored in the memory of the ECU 30. Based on the fuel injection period "Tqn" obtained in step S33, the correction value "c" is determined according to the map shown in FIG. 8. Then, the attenuation coefficient "k" in the formula (1) is corrected into "k*c" and the model waveform "CALn−1" is corrected. In the map shown in FIG. 8, as the fuel injection period "Tq" is longer, the attenuation coefficient "k" is made larger and an increasing rate of the coefficient "k" is made smaller.

When the model waveform "CALn−2" of the (n−2)-th fuel injection is subtracted from the detected waveform "W" in order to obtain the pressure waveform "Wn" of the n-th fuel injection, the correction value "c" is determined with respect to the attenuation coefficient "k" of the model waveform "CALn−2" according to the map shown in FIG. 8.

Figure 6E:

In step S35 (waveform extracting means), the model waveform "CALm" corrected in step S34 is subtracted from the detected waveform "W" obtained in step S21. Thereby, the pressure waveform "Wn" of the n-th fuel injection is obtained as shown in FIG. 5F and FIG. 6E.

According to the present embodiment, based on the inventors' study that an amplitude "A1" of the detected waveform "W0n−1" becomes smaller as the fuel injection period "Tqn" of the n-th fuel injection is longer, the attenuation coefficient "k" of the model waveform "CALn−1" is corrected according to the fuel-injection period "Tqn" of the n-th fuel injection in order to extract the pressure waveform "Wn" of the n-th fuel injection. Further, the attenuation coefficient "k" of the model wave "CALn−2" is corrected according to the fuel-injection period "Tqn" of the n-th fuel injection and the fuel-injection period "Tqn−1" of the (n−1)-th fuel injection. Therefore, since the model waveform "CALn−1" can be brought close to the detected waveform "W0n−1" shown in FIG. 9D, the pressure waveform "Wn" due to the n-th fuel injection can be extracted from the detected waveform "W" with high accuracy. The actual fuel injection condition "R3", "R8", "Rβ", "R4", "R7" and "Q" can be detected with high accuracy, and the engine output torque and the emission can be accurately controlled.

OTHER EMBODIMENT

The present invention is not limited to the embodiments described above, but may be performed, for example, in the following manner. Further, the characteristic configuration of each embodiment can be combined.

In the above embodiments, the model waveform "CAL" is expressed by the formula (1) and the reference pressure "p" is computed from the formula (1). Alternatively, the reference pressure "p" may be stored in a map, and this map may be used as the model waveform.

The control valve 14 may be a three-way valve. Even in a fuel injection period, the fuel in the back-pressure chamber 11c may not be leaked.

What is claimed is:
1. A fuel-pressure waveform detector which is applied to a fuel injection system including a fuel injector injecting a fuel into an internal combustion engine through a fuel injection hole, and a fuel-pressure sensor detecting a variation in the fuel pressure in a fuel-supply passage due to a fuel injection by the fuel injector, the fuel-pressure waveform detector comprising:

a detect-waveform obtaining means for obtaining a multi-stage injection pressure waveform by means of the fuel-pressure sensor while performing a multi-stage fuel injection during one combustion cycle of the internal combustion engine;

a model waveform store means for storing a reference model pressure waveform of when a previous fuel injection is performed before a subject fuel injection is performed;

a waveform extracting means for extracting a pressure waveform due to the subject fuel injection by subtracting the reference model pressure waveform from the multi-stage injection pressure waveform; and a correction means for correcting the reference model pressure waveform in such a manner that its attenuation degree becomes larger as a fuel injection period of the subject fuel injection is longer.

2. A fuel-pressure waveform detector according to claim 1, wherein in a case that the subject fuel injection is an n-th fuel injection in the multi-stage fuel injection, the model waveform store means stores at least a (n−1)-th model waveform due to a (n−1)-th fuel injection and a (n−2)-th model waveform due to a (n−2)-th fuel injection; and the waveform extracting means extracts the pressure waveform due to the n-th fuel injection by subtracting the (n−1)-th model waveform and the (n−2)-th model waveform from the multi-stage injection pressure waveform.

3. A fuel-pressure waveform detector according to claim 2, wherein the correction means corrects the attenuation degree of the (n−1)-th model waveform based on a fuel injection period of the n-th fuel injection and corrects the attenuation degree of the (n−2)-th model waveform based on fuel injection periods of the n-th fuel injection and the (n−1)-th fuel injection.

4. A fuel-pressure waveform detector according to claim 1, wherein the correction means corrects the reference model pressure waveform in such a manner that its attenuation degree becomes larger as a fuel injection period of the subject fuel injection is longer and a variation ratio of the attenuation degree becomes smaller as the fuel injection period of the subject fuel injection is longer.

5. A fuel-pressure waveform detector according to claim 1, wherein the fuel injector includes a valve body opening/closing the injection hole and a body defining a back-pressure chamber for applying a back-pressure to the valve body in a direction of closing the injection hole, when a fuel in the back-pressure chamber is leaked, the valve body opens the injection hole, and while the valve body opens the injection hole to perform a fuel injection, the fuel in the back-pressure chamber is always leaked.

* * * * *